F. JOHNSON.
MOTOR VEHICLE GEAR SHIFTING LEVER.
APPLICATION FILED NOV. 20, 1916.
1,308,495.
Patented July 1, 1919.
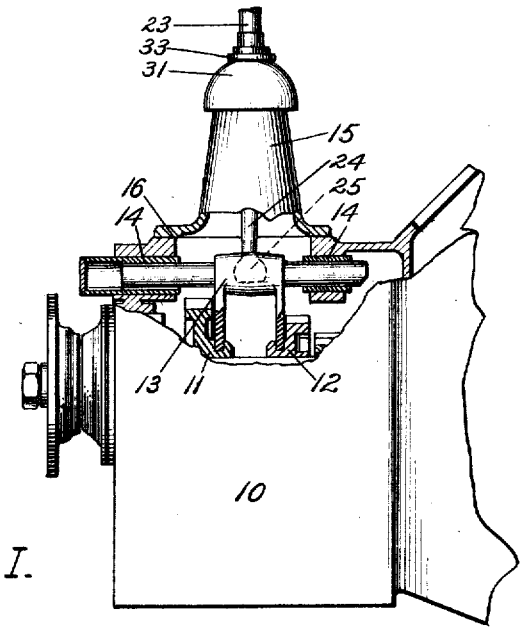
Fig. I.
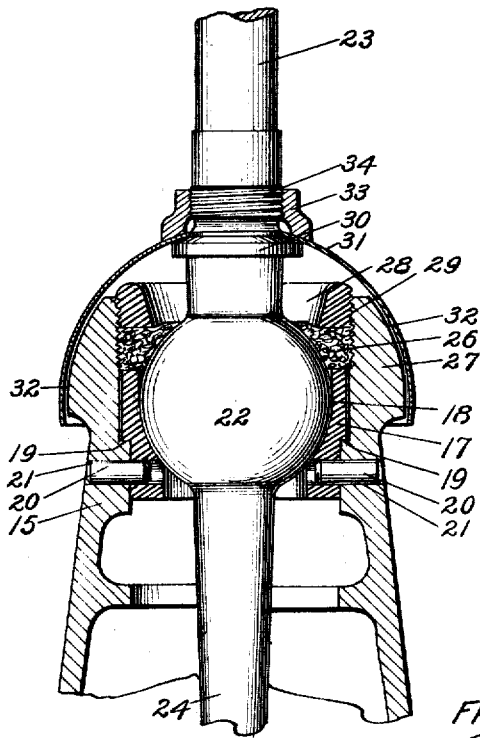
Fig. II.
INVENTOR
FRANK JOHNSON
BY
ATTORNEY

UNITED STATES PATENT OFFICE.

FRANK JOHNSON, OF DETROIT, MICHIGAN, ASSIGNOR TO CADILLAC MOTOR CAR COMPANY, OF DETROIT, MICHIGAN, A CORPORATION OF MICHIGAN.

MOTOR-VEHICLE GEAR-SHIFTING LEVER.

1,308,495.   Specification of Letters Patent.   Patented July 1, 1919.

Application filed November 20, 1916. Serial No. 132,311.

*To all whom it may concern:*

Be it known that I, FRANK JOHNSON, a citizen of the United States, and resident of Detroit, Wayne county, State of Michigan, have invented certain new and useful Improvements in Motor-Vehicle Gear-Shifting Levers, of which the following is a specification.

This invention relates to motor vehicles, and particularly to an improved mounting for shift levers of transmissions adapted for use therein.

One of the objects of this invention is to provide an improved ball and socket pedestal mounting which is comparatively simple in construction, inexpensive to manufacture and efficient in operation.

These and other objects will clearly appear from the following description taken in connection with the accompanying drawings, which form a part of the specification, and in which:

Figure 1 is a fragmentary side elevation with portions broken away, a transmission mechanism embodying this invention; and Fig. 2 is a fragmentary vertical section of parts illustrated in Fig. 1.

Referring to the drawings, 10 is the usual gear box, having gearing elements 11 and 12, adapted to be shifted by a slidable member 13, arranged in suitable bearings 14 of the gear box.

A pedestal or supporting cage 15 is suitably mounted over the opening 16 in the top of the gear box 10. A non-compressible socket member 17, preferably formed of steel and having a cup portion 18, is adapted to be inserted in the end of the pedestal member and to rest against its shoulder 19. Suitable pins 20 may be inserted through the openings 21 to lock the member 17 to the pedestal 15. A shifting lever comprising a ball portion 22, upwardly and downwardly extending arms 23 and 24, respectively, may be mounted in the cup portion 18 of the socket piece 17.

It will be noted that a ball 25 may be formed on the lower end of the arm 24 for shifting the member 13. A complementary ring member 26, preferably formed of a compressible material such as packing, may be slipped over the arm and arranged between the ball portion 22 and the neck portion 27 of the pedestal 15. These parts may be clamped in position by means of a collar 28 and threads 29.

A shoulder 30 may be formed integral with the arm 23 and a semi-spherical shell or cap 31 is arranged against the shoulder 30 and adapted to conform to the spherical exterior surface 32 of the pedestal 15. A clamping member 33 may be threaded on the arm 23, as at 34, for clamping the cap 31 against the shoulder 30. With these parts so assembled the shell 31 will partake of all movements of the ball member 22 and will at the same time properly house the ball and cup joint and protect the parts thereof from sand and grit and other foreign particles.

It will be noted that the compressible ring piece 26 coöperating with the clamping member 28, also provides a very efficient adjustment compensating for any wear of the relatively movable parts. The ring member, 26, also serves to prevent the leakage by the ball and socket joint of any lubricant within the pedestal chamber.

While I have described and will specifically claim what I deem to be a preferred embodiment of my invention, it will be obvious to those skilled in the art that various modifications and changes may be made without departing from the spirit and scope thereof.

Having thus described my invention, what I claim and desire to secure by Letters Patent is:

1. In a device of the class described, the combination with a supporting member having a metallic cup portion therein, and a ball member arranged in said cup portion and having the center thereof below the top of said cup, of a resilient member capping said cup and retaining said parts together.

2. The combination of a pedestal, a semispherical non-compressible cup piece mounted therein, a ball member in said cup and having the center thereof below the top of said cup, a ring-shaped packing member mounted on said ball member, and adjustable means for clamping said parts together.

3. The combination of a pedestal member, a cup-shaped non-compressible member detachably arranged therein, a ball member in said latter member with the center thereof below the top of said member, a complementary compressible ring member surrounding said ball member, and means for adjustably securing said parts in position.

4. The combination of a pedestal member, a cup-shaped non-compressible socket member detachably arranged therein, a ball member in said latter member with the center thereof below the top of said member, a complementary compressible socket member surrounding said ball member, said first socket member being fixed against rotation, and means for adjustably securing said parts in position.

5. The combination of a pedestal member, a metallic cup-shaped piece mounted therein, a ball member in said cup piece with the center thereof below the top of said cup, a ring-shaped complementary piece formed of packing adapted to fit a portion of said ball member, and means for clamping said parts in position.

In testimony whereof I affix my signature.

FRANK JOHNSON.

Copies of this patent may be obtained for five cents each, by addressing the "Commissioner of Patents, Washington, D. C."